2,818,400

UNSATURATED POLYESTER RESINS STABILIZED WITH 2 - HYDROXY - 5 - SALICYLYLBENZOPHE-NONE

Warren S. Forster, Basking Ridge, N. J., assignor to American Cyanamid Company, New York, N. Y., a corporation of Maine No Drawing. Original application August 2, 1955, Serial No. 526,060. Divided and this application November 29, 1956, Serial No. 624,994

3 Claims. (Cl. 260—45.4)

This invention relates to light stable resinous compositions and process of preparing the same. Still further, this invention relates to light stabilized resinous compositions such as unsaturated polyester resin compositions or polyvinyl chloride resin compositions containing from about 0.01% to about 5% by weight of 2-hydroxy-5-salicylylbenzophenone.

This application is a division of my application Serial No. 526,060, filed August 2, 1955.

One of the objects of the present invention is to stabilize resinous compositions such as unsaturated polyester resinous compositions or polyvinyl chloride resinous compositions from the deleterious effect of light and, more particularly, ultraviolet light by the incorporation therein of 2-hydroxy-5-salicylylbenzophenone. A further object of the present invention is to produce resinous compositions with markedly superior ultraviolet light absorption characteristics. These and other objects of the present invention will be discussed in greater detail hereinbelow.

Conventionel polyester resins such as those prepared by reacting an alpha, beta unsaturated polycarboxylic acid with a dihydric aliphatic alcohol and said polyester being in admixture with a polymerizable compound containing a $CH_2=C<$ group are extremely useful as resinous compositions, particularly in the field of molding, casting and laminating. If these polyester materials are used with dark pigments, such as maroon, black and the like, the effect of sunlight or, more particularly, ultraviolet light on said molded or cast articles is virtually insignificant. However, if these polyester resinous compositions are used without benefit of any coloring material where clear articles are desired and if said cast or molded articles are to be subjected to the sun's rays, they tend to show oftentimes marked yellowing which, of course, renders such an article less desirable because of this color deterioration. I have discovered that by incorporating into these conventional polyester resins, a small amount of 2-hydroxy-5-salicylylbenzophenone, I am able to inhibit the tendency of the resinous material to yellow in a cured state when subjected to ultraviolet light.

In the preparation of the unsaturated polyester resins of the present invention, one should make use of the alpha, beta unsaturated polycarboxylic acids such as maleic, fumaric, aconitic, itaconic, monochloro maleic anhydride and the like. These unsaturated acids should be present in an amount approximating at least 20% by weight of the total weight of the polycarboxylic acids used and preferably in amounts varying between about 25% and 65% by weight based on the total weight of polycarboxylic acid present. If it is desired to make use of saturated polycarboxylic acids, that is those which are free of non-benzenoid unsaturation, one could use such acids as phthalic, malonic, succinic, glutaric, sebacic and chlorinated polycarboxylic acids such as tetrachlorophthalic anhydride, hexachloroendomethylene tetrahydrophthalic acid and the like but in amounts correspondingly in proportion to the total amount of polycarboxylic acid present. Whenever available, the anhydrides of these acids may be used or mixtures of the acids or mixtures of the anhydrides thereof.

As polyhydric alcohols which may be used to prepare the unsaturatd polyesters of the present invention, it is preferred to make use of those alcohols having only two hydroxy groups although minor amounts of alcohols having three hydroxy groups, four hydroxy groups or more hydroxy groups may be used in minor amounts. As dihydroxy alcohols, one could use ethylene glycol, diethylene glycol, propylene glycol, dipropylene glycol, butanediol 1-4, butanediol 1-3, butanediol 1-2, pentanediol 1-2, pentanediol 1-3, pentanediol 1-4, pentanediol 1-5, hexanediol 1-6, and the like. Additionally, one could use glycerol, pentaerythritol, dipentaerythritol, and the like.

The modifier for the polyester resin is a polymerizable material having a $CH_2=C<$ group. Amongst these polymerizable compounds are styrene, side chain substituted styrenes such as the alpha methylstyrene, alpha ethylstyrene and the like or ring-substituted styrenes such as ortho, meta and para-alkyl styrenes such as o-methylstyrene, p-ethylstyrene meta-propylstyrene, 2,4-dimethylstyrene, 2,5-diethylstyrene and the like. Still further, one can make use of the allyl compounds such as diallyl phthalate, allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, allyl gluconate, allyl methylgluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane, and the like.

In order that the present invention may be more completely understood, the following examples are set forth in which all parts are parts by weight. These examples are set forth primarily for the purpose of illustration and any specific enumeration of detail set forth therein should not be interpreted as limitations on the case except as indicated in the appended claims.

RESIN A

A polyester resin is prepared by coreacting 3 mols of phthalic anhydride, 3 mols of maleic anhydride and 6.6 mols of propylene glycol. When esterification is substantially complete, as indicated by an acid number of about 30–40, there is added styrene in a sufficient amount to equal 39% of the polyester resin present and 0.08% by weight of hydroquinone based on the total weight of the unsaturated polyester and styrene, so that the ultimate composition contains 72 parts by weight of polyester resin per 28 parts by weight of monomeric styrene.

Example 1

To 100 parts of Resin A, there is added 0.25 part of 2-hydroxy-5-salicylylbenzophenone dissolved in 10 parts of styrene and 1 part of benzoyl peroxide dissolved in 1 part of tricresyl phosphate. The resinous composition thus prepared was cast into a 1/8 inch sheet by pouring into a cell composed of two glass plates separated by a 1/8 inch gasket and held together with clamps. The resin filled glass plates are cured in an oven gradually by heating to 250° F. and holding for about 3 hours. The cured resin is removed from the cell and samples taken therefrom are exposed to an S–1 sunlamp and in the Weatherometer. The light reflectancy of the castings was determined before exposure and measured periodically during exposure. When a 10% loss in reflectancy is recorded at 430 millimicrons, the test is concluded and the exposure time to obtain the 10% loss in reflectancy is recorded. Tests were additionally made on castings of the same unsaturated polyester resin composition devoid of any ultraviolet absorber. This was identified as a control. Still further, tests were made on the exact polyester resin composition containing an equivalent amount of a commercially available ultraviolet absorber. Results are given in the table set forth hereinbelow.

TABLE 1

| Unsaturated Polyester Resin Composition | S-1 Sunlamp [1] | Weatherometer [1] |
| --- | --- | --- |
| | Hrs. | Hrs. |
| Control | 144 | 100 |
| Commercially Available Ultraviolet Absorber | 356 | 500 |
| 2-hydroxy-5-salicylylbenzophenone | 966 | 2,000 |

[1] Time required before a 10% loss in reflectant light was recorded.

Example 2

100 parts of polyvinyl chloride, 50 parts of di-2-ethyl hexyl phthalate and 3 parts of 2-hydroxy-5-salicylylbenzophenone are blended together and fluxed on hot mill rolls at a temperature of about 130–150° C. for about 10–15 minutes. The resulting plasticized sheet was subjected to tests under the Fadometer. The first yellowing was observed after 1144 hours. The test was continued for 2200 hours at which time the test was discontinued. A comparable plasticized polyvinyl chloride sheet identical in every respect except that it contained no ultraviolet absorber was subjected to the same Fadometer test and displayed the first yellowing in 132 hours and, in fact, the test was discontinued at that point because further testing would have been of no significance.

Example 3

100 parts of polyvinyl chloride, 50 parts of di-2-ethyl hexyl phthalate, 4 parts of a heat stabilizer comprising a mixture of the cadmium soaps of ricinoleic and hexaonic acid and 0.15% of 2-hydroxy-5-salicylylbenzophenone are blended and fluxed on hot mill rolls for about 20 minutes at a mill temperature of about 130° C. In testing the plasticized sheet in the Fadometer, the first spot appeared in 528 hours, whereas the test was continued for a total of 1792 hours, before the sheet had deteriorated sufficiently to become sub-standard. A comparable sheet was prepared precisely as above except that it contained no ultraviolet absorber. In the Fadometer, this control sheet showed the first spot in 242 hours and the test was discontinued after 770 hours.

The following example will illustrate a method for the preparation of 2-hydroxy-5-salicylylbenzophenone.

PREPARATION OF 2-HYDROXY-5-SALICYLYL-BENZOPHENONE

To a mixture of 102 parts (0.6 mol) of o-methoxybenzoyl chloride and 300 parts of thiophene-free benzene were added 102 parts of anhydrous aluminum chloride. The mixture was then heated while stirring to about 90° C. holding the mixture at 79–90° C. for 2¼ hours. To the cooled mixture was added 500 parts of 5 N-hydrochloric acid and the benzene layer separated. This was washed with very dilute hydrochloric acid and then steamed with super-heated steam. The oily material from all of the collected distillate was then distilled at 1.5 mm. pressure, taking off 2-hydroxybenzophenone at a head temperature of 127–133° C. The residue, remaining undistilled, was recrystallized from 200 parts of 95% alcohol to give 13.6 parts of the desired product melting at 127.9–130.1° C. Microanalysis of this product showed:

Calculated for $C_{20}H_{14}O_4$: C, 75.46; H, 4.43. Found: C, 74.75; H, 4.00.

This compound is also known chemically as 2-benzoyl-4-salicyloylphenol.

In Example 3, use was made of a heat stabilizer. These heat stabilizers are metallic soaps of fatty acids such as the metallic soaps of caproic, caprylic, lauric, myristic, palmitic, stearic, myristoleic, palmitoleic, oleic, linoleic, linolenic, elaeostearic, ricinoleic acids and the like. Oftentimes, these metallic soaps are used in combination with one another. The metallic portion of the soap may be such metals as cadmium, lead, strontium, tin, barium and the like. The amount of heat stabilizer utilized is conventional and is well known in the art.

The amount of the 2-hydroxy-5-salicylylbenzophenone which may be used in the resinous compositions of the present invention may vary between about 0.01 and 5% by weight based on the total weight of resin solids, actual or potential, whichever is greater. Preferably, one may use between 0.1 and 1.0% by weight based on the total weight of the resin solids.

In the preparation of the unsaturated polyester used in the present invention, one could use the polyhydric alcohols and polycarboxylic acids in a proportion substantially equalling about mole per mol and preferably an excess of alcohol approximating 10% above the stoichiometrical quantity required for complete esterification. When polyhydric alcohols having more than 2 hydroxy groups are used, calculations should be made on a stoichiometrical basis so as to make allowance for the additional hydroxy groups, such as those found in glycerol, pentaerythritol, dipentaerythritol and the like. This is equally true when polycarboxylic acids having greater than 2 carboxyl groups are used. The important thing to remember is that on a stoichiometrical basis, a sufficient quantity of the alcohol and acid should be reacted so as to give an ultimate unsaturated polyester resinous material having an acid number not significantly greater than 100 and preferably not significantly greater than 50. For optimum results, the polyester resinous materials should be reacted in adequate quantities of alcohol and acid so as to give a polyester resin having an acid number not significantly greater than 30–40.

In the preparation of the polymerizable polyester compositions of the present invention, one could use between about 20 parts by weight of the monomeric compound containing the polymerizable $CH_2=C<$ group to 80 parts of the unsaturated polyester resin up to 80 parts of the monomer compound containing a polymerizable

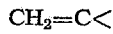
$$CH_2=C<$$

group to 20 parts of the unsaturated polyester resin. As a preferred embodiment, however, it is desired to use about 33 parts of the monomeric polymerizable compound containing the $CH_2=C<$ group to each 67 parts of the unsaturated polyester resinous material.

The compositions containing the unsaturated polyester resin and the compound containing the polymerizable $CH_2=C<$ group are disclosed in a plurality of U. S. patents, such as 2,443,735–41, inclusive, amongst others.

In the formulation of the polyester resinous compositions of the present invention, it is imperative to use a catalyst of the peroxide class of which a great plurality are set forth in those U. S. patents mentioned hereinabove. The amount of catalyst may vary very appreciably from about 0.1–10% by weight based on the total weight of the polymerizable composition. Preferably, one would use between about 0.5 and about 1% by weight of these catalysts, based on the total weight of the polymerizable resinous composition.

If it is desired to effect low temperature cure of the unsaturated polyester resinous composition, it will be desirable to make use of a material commonly referred to as a promoter. These promoters, such as mercaptans, the alkyl substituted anilines and the metallic salt driers, e. g., cobalt naphthenate, are generally dispersed in a solution of a suitable solvent material, such as the monomeric polymerizable material. If high temperature cure is to be accomplished, a promoter is not necessary. Promoters which are useful in this connection have been disclosed in prior art as represented by such patents as U. S. 2,466,800 and 2,480,928.

In addition to the promoters disclosed hereinabove, one may make use of such promoters as benzamidine hydrochloride, ethylene guanidine hydrochloride, and the like. These promoters may be used singly or in combination with one another and, if desired, may be used in combination with certain naphthenic driers such as copper naphthenate, and the like.

I claim:

1. A light stable resinous composition comprising a copolymerizable mixture of (1) an unsaturated polyester resin, prepared by reacting a polyhydric alcohol with an alpha, beta ethylenically unsaturated polycarboxylic acid (2) a compound containing a polymerizable $CH_2=C<$ group, (3) an addition polymerization catalyst for (1) and (2) and (4) 0.01%–5% by weight of 2-hydroxy-5-salicylylbenzophenone.

2. A light stable resinous composition comprising a copolymerizable mixture of (1) an unsaturated polyester resin, prepared by reacting a polyhydric alcohol with an alpha, beta ethylenically unsaturated polycarboxylic acid (2) styrene, (3) an addition polymerization catalyst for (1) and (2) and (4) 0.01%–5% by weight of 2-hydroxy-5-salicylylbenzophenone.

3. A light stable resinous composition comprising a copolymerizable mixture of (1) an unsaturated polyester resin, prepared by reacting a polyhydric alcohol with an alpha, beta ethylenically unsaturated polycarboxylic acid (2) diallyl phthalate, (3) an addition polymerization catalyst for (1) and (2) and (4) 0.01%–5% by weight of 2-hydroxy-5-salicylylbenzophenone.

References Cited in the file of this patent

UNITED STATES PATENTS

| | | |
|---|---|---|
| 2,693,492 | Hoch | Nov. 2, 1954 |
| 2,755,259 | Dilke et al. | July 17, 1956 |
| 2,777,828 | Day et al. | Jan. 15, 1957 |